United States Patent [19]

Wakamiya

[11] Patent Number: 4,705,364
[45] Date of Patent: Nov. 10, 1987

[54] WIDE ANGLE LENS
[75] Inventor: Koichi Wakamiya, Tokyo, Japan
[73] Assignee: Nippon Kogaku K. K., Tokyo, Japan
[21] Appl. No.: 867,692
[22] Filed: May 28, 1986
[30] Foreign Application Priority Data
  Jun. 5, 1985 [JP] Japan ............... 60-121753
[51] Int. Cl.$^4$ .................... G02B 9/62; G02B 9/64
[52] U.S. Cl. ................... 350/463; 350/464
[58] Field of Search ............ 350/463, 418, 464, 460, 350/461, 450

[56] References Cited
FOREIGN PATENT DOCUMENTS
  59-13210  1/1984  Japan .
  0690422  10/1979  U.S.S.R. ............... 350/464

*Primary Examiner*—John K. Corbin
*Assistant Examiner*—Rebecca D. Gass
*Attorney, Agent, or Firm*—Shapiro and Shapiro

[57] ABSTRACT

A wide angle lens having a long back focus substantially equal to the rear focal length of the total lens system comprising six lens components with a stop between the third and fourth components from the object side satisfies the conditions:

$$0.5 < \phi_2/\phi_6 < 1.4$$

$$0.8f < f_3 < 1.5f$$

$$0 < f/f_R < 0.5$$

$$0.8f < r_2 < 1.5$$

wherein f is the image-side focal length of the total system, $\phi_2$ and $\phi_6$ are refractive powers of the second and the sixth components, $f_3$ is the focal length of the third component, $f_R$ is the composite focal length of the fourth to the sixth components and $r_2$ is the radius of curvature of the image-side lens surface of the first component.

7 Claims, 2 Drawing Figures

WIDE ANGLE LENS

BACKGROUND OF THE INVENTION

1. Field of the Invention

The present invention relates to a wide angle lens having a long back focus substantially equal to the rear focal length and more particularly to such a wide angle lens useful for taking a picture underwater.

2. Related Background Art

An underwater camera provided with a negative-positive-negative symmetric type wide angle lens is known in the art which has an angle view of about 80° and a F number of about 2.8. However, the known underwater camera has an important drawback that the back focus of the wide angle lens is short for the rear focal length f of the total system. The back focus is only 0.55.f which is too short to provide a sufficient space enough to receive a light measuring device between the lens and the image plane.

One of the well-known methods for extending the back focus is to use a so-called retro-focus type (inverted telephototype) lens. As an example, in the wide angle lens disclosed in Japanese Patent Application laid open No. 13210/1984 the applicant of which is the same as the applicant of the present application, the back focus has successfully been extented to a value of 2.0 f or more according to the prior art method. However, this prior method for the extension of back focus involves some problems.

If the back focus is extented too much, a substantial increase of the total size of the apparatus is needed, which reduces the portability of the underwater camera. In addition, it may cause the problem of water leakage in the underwater camera. On the other hand, if the retro-focus type wide angle lens is designed to have a back focus of about 1.0 f, the exit angle of light is increased too much due to the exit pupil being close to the image side. The increase of the exit angle enhances the field curvature of the lens. In this case, therefore, it is very difficult to obtain good image-forming characteristics of the lens.

SUMMARY OF THE INVENTION

Accordingly, the object of the present invention is to provide a wide angle lens having a back focus substantially equal to the rear focal length which is compact in construction and exhibits good image-forming performance.

In the wide angle lens proposed by the present invention, the respective aberrations are compensated well by satisfying various conditions necessary therefor on the specific state in which the first surface of the object-side first component contacts with water.

The wide angle lens according to the invention comprises six lens components $L_1$ to $L_6$ arranged successively from the object-side with a stop between the third and the fourth components $L_3$ and $L_4$. The first component $L_1$ has a concave surface on the image side. The second component $L_2$ is a negative meniscus lens with its convex surface on the object side. The third component $L_3$ includes a positive lens having a convex surface on the object-side. The fourth component $L_4$ is a meniscus lens with its convex surface on the image side. The fifth component $L_5$ is a positive lens having a convex surface on the image-side. The sixth component $L_6$ is a negative meniscus lens with its convex surface on the image-side.

The wide angle lens comprising the above-mentioned components is designed to satisfy the following conditions:

$$0.5 < \phi_2/\phi_6 < 1.4 \qquad (1)$$

$$0.8f < f_3 < 1.5f \qquad (2)$$

$$0 < f/f_R < 0.5 \qquad (3)$$

$$0.8f < r_2 < 1.5f \qquad (4)$$

wherein, f is the focal length on the image side of the whole system;

$\phi_2$ is the refractive power of the second component $L_2$;

$\phi_6$ is the refractive power of the sixth component $L_6$;

$f_3$ is the focal length of the third component $L_3$;

$f_R$ is the composite focal length of the fourth, the fifth and the sixth components; and $r_2$ is the radius of curvature of the image-side surface of the first component $L_1$.

Features of the wide angle lens according to the invention will be described in detail in connection with the above-shown condition.

In the arrangement of the components of the wide angle lens according to the invention, a negative lens is located on the object-side to obtain a large angle of view. This use of a negative lens on the object side is a common feature to all of the retro-focus type lenses. However, in order to extend the back focus not so much but to the extent enough to obtain a back focus nearly equal to the rear focal length, it is absolutely necessary to provide another negative lens also on the image-side and to determine the optimum refractive power ratio of the positive-side negative lens to the imageside negative lens. This is the reason for which the condition (1) has been determined.

If the refractive power $\phi_2$ of the second component $L_2$ is so strong, compared with the refractive power $\phi_6$ of the sixth component $L_6$, that the ratio of $\phi_2/\phi_6$ is near to the upper limit of the condition (1), the back focus of the lens system is apt to become too long and generate the negative distortion too much by the relatively strong diverging action of the second component.

When the refractive power ratio is over the upper limit of the above condition (1), there is obtained a too long back focus and the distortion in negative sign increases too much. It is no longer possible to adequately compensate the distortion. To compensate the negative distortion well, it is desirable that the value of $\phi_2/\phi_6$ be as small as possible. But, if the lower limit of the condition (1) is exceeded, the back focus is too short. Therefore, it is difficult to obtain the aimed long back focus.

The aimed length of the back focus in the present invention is a value substantially equal to the imageside focal length of the total system. To achieve the aimed value, it is necessary for the diverging components on the object-side to have somewhat larger refractive power as that in the symmetrical construction type of lens as seen from the conditional formula (1). More specifically, it is desirable to further satisfy the following condition:

$$1.4 \leq \phi_{12}/\phi_6 \leq 2.5$$

wherein, $\phi_{12}$ is the composite refractive power of the first and the second components and $\phi_6$ is the refractive power of the sixth component $L_6$.

When the share of power to the diverging components is determined in this manner, the distortion has the tendency to be always negative in sign. In the lens system according to the invention, the distortion is well compensated by the positive lens L that is the third component disposed directly before the stop S. The above conditional formula (2) represents the condition necessary for the optimum compensation of the distortion by the third lens component $L_3$.

If the upper limit of the condition (2) is exceeded, the refractive power of the third component as a positive lens is too weak to compensate the negative distortion adequately. If the refractive power of the third lens component is increased up beyond the lower limit of the condition (2), there is produced high order aberrations. Especially, the higher aberration of the spherical aberration grows too large to be compensated well.

In a preferred embodiment, the third component $L_3$ includes a cemented lens composed of a positive lens and a negative lens for the purpose of good compensation of chromatic aberration. In this case, it is preferable that the negative lens in the cemented lens has a higher refractive index than the positive lens. By doing so. the generation of spherical aberration by the third component $L_3$ can be minimized. If the refractive index of the positive lens is higher than that of the negative one in the cemented lens, the third component $L_3$ generates the spherical distortion in negative sign so much that there may be easily produced ring zone aberration.

The conditional formula (3) represents the condition which the lens components after the stop S must satisfy. The composite refractive power of the components after the stop S, namely the fourth, the fifth and the sixth lens components has to be positive as shown by the condition (3). By keeping the composite refractive power positive, the respective aberrations, especially coma can be kept at the optimum level while attaining the aimed back focus which is substantially equal to the composite rear focal length of the total system.

If the composite refractive power of the lens components after the stop is a negative value beyond the lower limit of the condition (3), the diverging action of the fourth and the sixth components $L_4$ and $L_6$ is so strong relative to the fifth component $L_5$, a positive lens that the coma is made worse.

On the contrary, if the upper limit of the condition (3) is exceeded, the converging action of the fifth lens component $L_5$ becomes too strong and the coma is made worse also. As a matter of course, the diverging action of the components before the stop increases up relatively and therefore the back focus is rendered longer than the necessary value. In summary, if the upper limit of the condition (3) is exceeded, the back focus is extended unnecessarily long and it is difficult to keep the well-balanced aberrations due to the generation of coma.

The fourth lens component $L_4$ disposed directly after the stop S is in the form of a meniscus with its concave surface on the object-side, which serves to compensate Petzval sum toward the negative sign. This is significant because the Petzval sum in this system has the tendency to be positive. The meniscus lens component $L_4$ serves also to extend the back focus of the total system. The load which the first and the second components $L_1$ and $L_2$ before the stop must bear for obtaining the aimed back focus is lessened by this function of the fourth component. In a preferred embodiment of the invention, the object-side surface of the fourth component $L_4$, that is, the surface facing the stop S has a radius of curvature $R_S$ which satisfies the following condition.

$-0.9f < R_S < -0.3f$

The fifth component $L_5$ which is a positive lens, takes a part of converging action of the total system like the third component $L_3$. The fifth component $L_5$ converges even those rays which reach the marginal of the image. In a preferred embodiment, the fifth lens component $L_5$ satisfies the condition: $|R_{51}| > |R_{52}|$ wherein, $R_{51}$ is the radius of curvature of the object-side surface of the fifth component and $R_{52}$ is the radius of curvature of the image side surface of the same.

When the above condition is satisfied, the aberrations of coma and astigmatism may be compensated well because the converging action of the five component may be well-ballanced with the diverging action of the sixth component $L_6$ which is a negative meniscus lens.

Since the wide angle lens according to the invention is intended to use under water, the objectside surface of the first component $L_1$ contacts with water. The refractive index of water $n_0$ is 1.33306. Therefore, the relative refractive index of the first component to water is low and the first lens surface takes a very small part of the refractive power. But, the lens surface contacting with air on the image-side has a strong refractive power.

Generally speaking, it is advantageous for the wide angle lens that man makes the first component $L_1$ have a diverging action, at least under water, so as to obtain a wide angle of view. However, since the imageside surface of the first lens component $L_1$ has a determinative effect on the refractive power, man should select the most appropriate refractive power to the image-side surface of the first component $L_1$. Otherwise, a remarkedly large amount of astigmatism may be produced.

If such a large amount of astigmatism is produced, it is no longer possible to compensate the astigmatism well by the second component $L_2$ and the following components. In brief, if the radius of curvature $r_2$ of the image-side surface of the first component $L_1$ is over the upper limit or under the lower limit of the condition (4), there is produced so much astigmatism that it can not be well compensated in the total system.

The underwater lens is needed to be sealed against water. For this reason, the first lens component $L_1$ which contacts with water is fixed to a lens tube as a rule. The second lens component $L_2$ and the following components are moved for focusing. In this connection it is to be noted that the height of entrance of the oblique rays incident to the first lens component is variable in a wide range depending upon the moved distance by the components for focusing. When the refractive power of the first lens component $L_1$ is not appropriate, the variation of aberrations depending on the object distance becomes larger. The conditional formula (4) represents also the condition necessary for preventing such a large variation of aberrations depending on the object distance especially the variation of meridional field curvature.

If the limit of the condition (4) is exceeded, the meridional field becomes negative in sign for close distance. If the upper limit is exceeded, the meridional field is positive in sign for close distance. In either case, there occurs great variation of meridional field curvature which is difficult to compensate well.

As seen from the foregoing, the present invention has realized a wide angle lens for underwater which has a back focus substantially equal to the rear focal length of the total system, which means a compact optical system, an angle of view of about 80 degrees and a F number up to 2.6 and in which the respective aberrations are well ballanced.

DESCRIPTION OF THE PREFERRED EMBODIMENTS

Figure 1:
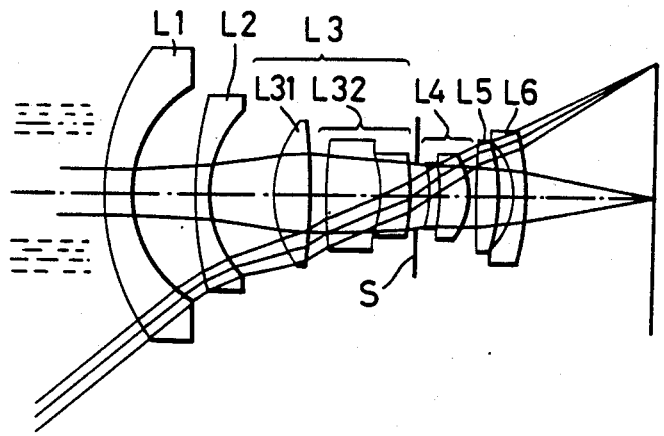
FIG. 1 shows the lens construction of the first embodiment of the invention.

A first embodiment of the present invention is schematically shown in FIG. 1.

The embodiment comprises six lens components, the first, the second, the third, the fourth, the fifth and the sixth components $L_1$, $L_2$, $L_3$, $L_4$, $L_5$ and $L_6$ arranged successively from the object side.

The first component $L_1$ is a negative meniscus lens with its convex surface on the object-side. The second component $L_2$ is also a negative meniscus lens with its convex surface on the object-side. The third component $L_3$ is composed of a positive lens with its stronger curvature surface on the object-side $L_{31}$ and a cemented lens $L_{32}$. The fourth component $L_4$ is a cemented meniscus lens consisting of a negative lens and a positive lens cemented together whose convex surface is on the object-side. The fifth component $L_5$ is a positive lens with its stronger curvature surface on the image-side. The sixth component $L_6$ is a negative meniscus lens with its convex surface on the image-side. A stop S is disposed between the third and the fourth lens components $L_3$ and $L_4$.

To obtain an effective water-proof and water pressure resistant structure, the first component $L_1$ is fixed stationary relative to the image plane. The remaining components $L_2$ to $L_6$ can be moved together toward an object for focusing to the object at a short distance. However, it is also possible to move the whole lens system as a unit for focusing. In this case, the variation of aberrations caused by the movement for focusing may be compensated by changing the air distance between the positive lens $L_{31}$ and the cemented positive lens $L_{32}$ in the third lens component $L_3$ in such manner that the air distance is gradually decreased with shortening of the object distance.

The data of the first embodiment is shown in the following table, Table 1.

In the table, the number in the left-most column is ordinal from the object-side. The refractive index n and Abbe's number $\nu$ are values measured to d-ray ($\lambda=587.6$ nm). The lens has been designed assuming that the refractive index of water $n_0=1.33306$ and Abbe's number of water $\nu_0=54.0$.

$\phi_2$ and $\phi_6$ are refractive powers of the second and the sixth lens components $L_2$ and $L_6$. $\phi_{12}$ is the composite refractive power of the first and the second lens components $L_1$ and $L_2$. $f_R$ is the composite focal length of the fourth and the sixth lens components $L_4$ and $L_6$.

TABLE 1

Focal length = 100
F number 2.8

| No | radius of curvature r | thickness air distance on axis d | refractive index n | Abbe's number $\nu$ | |
|---|---|---|---|---|---|
| 1 | 187.432 | 24.992 | 1.51680 | 64.1 | $L_1$ |
| 2 | 105.192 | 49.984 | | | |
| 3 | 201.287 | 9.997 | 1.77279 | 49.4 | $L_2$ |
| 4 | 91.110 | 55.483 | | | |
| 5 | 114.449 | 24.992 | 1.67003 | 47.1 | $L_3$ |
| 6 | −737.240 | 13.496 | | | |
| 7 | 326.483 | 47.485 | 1.69350 | 53.8 | |
| 8 | −92.026 | 23.993 | 1.75520 | 27.6 | |
| 9 | −207.780 | 19.993 | | | |
| 10 | −60.235 | 4.998 | 1.78470 | 26.1 | $L_4$ |
| 11 | −139.846 | 25.992 | 1.69680 | 55.6 | |
| 12 | −70.366 | 2.499 | | | |
| 13 | 2086.164 | 18.994 | 1.79668 | 45.5 | $L_5$ |
| 14 | −128.995 | 8.997 | | | |
| 15 | −72.981 | 9.997 | 1.58144 | 40.8 | $L_6$ |
| 16 | −215.418 | | | | |

Stop is at 14.995 on the object-side of the 4th lens $L_4$
Bf = 103.904       $f_3$ = 102.4
$\phi_2$ = −0.00446    $\phi_{12}$ = −0.00928
$\phi_6$ = −0.00513
$f_R$ = 575.08

Other data of the first embodiment obtained when it was moved for focusing are as follows:

When the lens system was in the position of infocus to a near distance object, the picture-taking magnification $\beta$ was −0.1.

When the focusing was carried out employing the first-mentioned focusing method where the lens group of the second to the sixth components $L_2$ to $L_6$ is moved as a unit while keeping the first component $L_1$ stationary to the image plane, the distance $d_2$ between the fixed first component $L_1$ and the moving second component $L_2$ was 37.676.

When the focusing was carried out employing the second-mentioned method where the whole lens system is moved for focusing while decreasing the air distance between two elements of the third component $L_3$ to compensate the variation of aberrations, the variable air distance $d_6$ between the two elements of the third component was 11.8 for the in-focus position to a near distance object.

Figure 2:
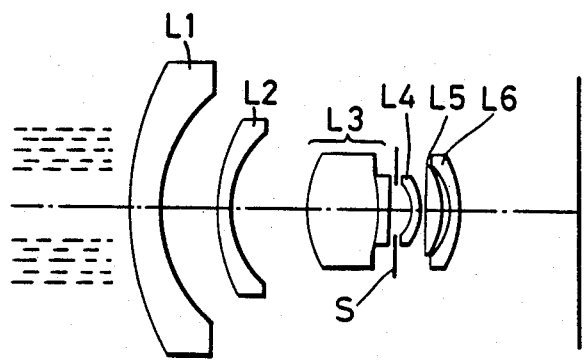
FIG. 2 shows the lens construction of the second embodiment of the invention.

A second embodiment of the present invention is schematically shown in FIG. 2.

Again, the embodiment comprises six lens components, the first, the second, the third, the fourth, the fifth and the sixth components $L_1$, $L_2$, $L_3$, $L_4$, $L_5$ and $L_6$ arranged successively from the object side.

The first component $L_1$ is a negative meniscus lens with its convex surface on the object-side. The second component $L_2$ is also a negative meniscus lens with its convex surface on the object-side. The third component $L_3$ is a cemented positive lens composed of a positive lens and a negative lens with the convex surface on the object-side. The fourth component $L_4$ is a negative meniscus lens with its convex surface on the image-side. The fifth component $L_5$ is a positive lens with its stronger curvature surface on the image-side. The sixth componnet $L_6$ is a negative meniscus lens with its convex surface on the image-side. A stop S is disposed between the third and the fourth lens components $L_3$ and $L_4$.

Similarly to the above first embodiment, the data of the second embodiment are shown in the following table, Table 2.

TABLE 2

Focal length = 100
F number 2.8

| No | radius of curvature r | thickness air distance on axis d | refractive index n | Abbe's number | |
|---|---|---|---|---|---|
| 1 | 263.780 | 25.000 | 1.51680 | 64.1 | $L_1$ |
| 2 | 112.495 | 50.000 | | | |
| 3 | 113.225 | 8.500 | 1.84042 | 43.3 | $L_2$ |
| 4 | 75.650 | 70.000 | | | |
| 5 | 77.590 | 60.000 | 1.74810 | 52.3 | $L_3$ |
| 6 | −112.495 | 10.000 | 1.78472 | 25.8 | |
| 7 | −574.595 | 20.000 | | | |
| 8 | −39.720 | 10.000 | 1.72825 | 28.3 | $L_4$ |
| 9 | −45.050 | 2.500 | | | |
| 10 | −1528.500 | 11.500 | 1.62041 | 60.3 | $L_5$ |
| 11 | −92.290 | 10.000 | | | |
| 12 | −47.830 | 7.500 | 1.80518 | 25.4 | $L_6$ |
| 13 | −73.456 | | | | |

Stop is at 15.000 on the object-side of 4th lens $L_4$
Bf = 100.847   $f_3 = 97.4$
$\phi_2 = -0.00331$   $\phi_{12} = -0.00795$
$\phi_6 = -0.00511$
$f_R = 1072.3$ In case of the second embodiment, the focusing to a near distance object is carried out by moving the second component $L_2$ and the following components together while keeping the first component $L_1$ fixed relative to the image plane. For the taking magnification $\beta = -0.1$, the distance $d_2$ the fixed first component $L_2$ and the moving second component $L_2$ is 37.663.

In both of the first and the second embodiments of the present invention, the respective aberrations have been compensated very well not only for an object at infinity but also for an object at a close distance. The embodiments has exhibited excellent image-forming performance.

While I have shown and described certain present preferred embodiments of the invention it is to be distinctly understood that the invention is not limited thereto but may be other wise variously embodied within the scope of the following claims.

I claim:

1. A wide angle lens comprising six lens components arranged successively from the object-side with a stop between the third and the fourth components, wherein the first component has a concave surface on the image-side, the second component is a negative meniscus lens with its convex surface on the object-side, the third component includes a positive lens having a convex surface on the object-side, the fourth component is a meniscus lens with its concave surface on the object-side, the fifth component is a positive lens having a convex surface on the image-side and the sixth component is a negative meniscus lens with its convex surface on the image-side, and these components satisfy the conditions:

$0.5 < \phi_2/\phi_6 < 1.4$
$0.8f < f_3 < 1.5f$
$<0 \, f/f_R < 0.5$
$0.8f < r_2 < 1.5f$ wherein, f is the focal length on the image side of the whole system;
$\phi_2$ is the refractive power of the second component;
$\phi_6$ is the refractive power of the sixth component;
$f_3$ is the focal length of the third component;
$f_R$ is the composite focal length of the fourth, the fifth and the sixth components; and $r_2$ is the radius of curvature of the image-side surface of the first component.

2. A wide angle lens according to claim 1, wherein the lens components further satisfy the condition $1.4 < \phi_{12}/\phi_6 < 2.5$ wherein, $\phi_{12}$ is the composite refractive power of the first and the second components and
$\phi_6$ is the refractive power of the sixth component.

3. A wide angle lens according to claim 1, wherein the third lens component comprises a cemented lens composed of a positive lens and a negative lens and the refractive index of the negative lens is higher than that of the positive lens.

4. A wide angle lens according to claim 1, wherein the radius of curvature $R_S$ of the object-side lens surface of the fourth component is within the range of $-0.9f < R_S < -0.3f$ 5. A wide angle lens according to claim 1, wherein the fifth lens component is composed of a single lens so formed that the radius of curvature of the object-side lens surface is larger than the radius of curvature of the image-side surface in absolute value.

6. A wide angle lens according to claim 1, which is characterized by the following data:

Focal length = 100
F number 2.8

| No | radius of curvature r | thickness air distance on axis d | refractive index n | Abbe's number ν | |
|---|---|---|---|---|---|
| 1 | 187.432 | 24.992 | 1.51680 | 64.1 | $L_1$ |
| 2 | 105.192 | 49.984 | | | |
| 3 | 201.287 | 9.997 | 1.77279 | 49.4 | $L_2$ |
| 4 | 91.110 | 55.483 | | | |
| 5 | 114.449 | 24.992 | 1.67003 | 47.1 | $L_3$ |
| 6 | −737.240 | 13.496 | | | |
| 7 | 326.483 | 47.485 | 1.69350 | 53.8 | |
| 8 | −92.026 | 23.993 | 1.75520 | 27.6 | |
| 9 | −207.780 | 19.993 | | | |
| 10 | −60.235 | 4.998 | 1.78470 | 26.1 | $L_4$ |
| 11 | −139.846 | 25.992 | 1.69680 | 55.6 | |
| 12 | −70.366 | 2.499 | | | |
| 13 | 2086.164 | 18.994 | 1.79668 | 45.5 | $L_5$ |
| 14 | −128.995 | 8.997 | | | |
| 15 | −72.981 | 9.997 | 1.58144 | 40.8 | $L_6$ |
| 16 | −215.418 | | | | |

Stop is at 14.995 on the object-side of the 4th lens $L_4$
Bf = 103.904   $f_3 = 102.4$
$\phi_2 = -0.00446$   $\phi_{12} = -0.00928$
$\phi_6 = -0.00513$
$f_R = 575.08$ wherein, $\phi_2$ is the refractive power of the second component $L_2$;
$\phi_6$ is the refractive power of the sixth component $L_6$ and
$\phi_{12}$ is the composite refractive power of the first and the second components $L_1$ and $L_2$.

7. A wide angle lens according to claim 1, which characterized by the following data:

Focal length = 100
F number 2.8

| No | radius of curvature r | thickness air distance on axis d | refractive index n | Abbe's number ν |
|---|---|---|---|---|

-continued

| | Focal length = 100 F number 2.8 | | | | |
|---|---|---|---|---|---|
| 1 | 263.780 | 25.000 | 1.51680 | 64.1 | $L_1$ |
| 2 | 112.495 | 50.000 | | | |
| 3 | 113.225 | 8.500 | 1.84042 | 43.3 | $L_2$ |
| 4 | 75.650 | 70.000 | | | |
| 5 | 77.590 | 60.000 | 1.74810 | 52.3 | $L_3$ |
| 6 | −112.495 | 10.000 | 1.78472 | 25.8 | |
| 7 | −574.595 | 20.000 | | | |
| 8 | −39.720 | 10.000 | 1.72825 | 28.3 | $L_4$ |
| 9 | −45.050 | 2.500 | | | |
| 10 | −1528.500 | 11.500 | 1.62041 | 60.3 | $L_5$ |
| 11 | −92.290 | 10.000 | | | |
| 12 | −47.830 | 7.500 | 1.80518 | 25.4 | $L_6$ |

-continued

| | Focal length = 100 F number 2.8 | | | | |
|---|---|---|---|---|---|
| 13 | −73.456 | | | | |

Stop is at 15.000 on the object-side of the 4th lens $L_4$
Bf = 100.847  $f_3$ = 97.4
$\phi_2$ = −0.00331  $\phi_{12}$ = −0.00795
$\phi_6$ = −0.00511
$f_R$ = 1072.3 wherein, $\phi_2$ is the refractive power of the second component $L_2$;

$\phi_6$ is the refractive power of the sixth component $L_6$ and $\phi_{12}$ is the composite refractive power of the first and the second components $L_1$ and $L_2$.

* * * * *